(12) United States Patent
Butler

(10) Patent No.: US 9,928,978 B1
(45) Date of Patent: Mar. 27, 2018

(54) DEVICE MONITORING PREVENTION IN POWER SYSTEMS

(71) Applicant: Sean Butler, Gainesville, FL (US)

(72) Inventor: Sean Butler, Gainesville, FL (US)

(*) Notice: Subject to any disclaimer, the term of this patent is extended or adjusted under 35 U.S.C. 154(b) by 203 days.

(21) Appl. No.: 14/672,975

(22) Filed: Mar. 30, 2015

(51) Int. Cl.
*H01H 47/00* (2006.01)
*H02J 3/00* (2006.01)

(52) U.S. Cl.
CPC .............. *H01H 47/00* (2013.01); *H02J 3/00* (2013.01)

(58) Field of Classification Search
CPC ................................ G08C 19/00; G06F 21/24
See application file for complete search history.

(56) References Cited

U.S. PATENT DOCUMENTS

| | | | |
|---|---|---|---|
| 4,858,141 | A | 8/1989 | Hart |
| 6,566,858 | B1 | 5/2003 | Silverbrook |
| 7,405,574 | B2 | 7/2008 | Wasaki |
| 7,526,087 | B2 | 4/2009 | Sun |
| 8,094,034 | B2 | 1/2012 | Patel |
| 8,664,937 | B2 | 3/2014 | Fisera |
| 2003/0185392 | A1 | 10/2003 | Sun |
| 2007/0268063 | A1 | 11/2007 | Wasaki |
| 2009/0045803 | A1 | 2/2009 | Schoettle |
| 2011/0270453 | A1 | 11/2011 | Kalogridis |
| 2011/0271352 | A1* | 11/2011 | Kalogridis ............... G01D 4/02 726/26 |
| 2013/0124123 | A1 | 5/2013 | Patel |
| 2013/0154849 | A1 | 6/2013 | Denic |
| 2013/0191118 | A1 | 7/2013 | Makino |

FOREIGN PATENT DOCUMENTS

WO    WO/2011/153401    12/2011

* cited by examiner

*Primary Examiner* — Jeffrey Shin
(74) *Attorney, Agent, or Firm* — Maxwell L. Minch; GrayRobinson, P.A.

(57) ABSTRACT

Devices, systems and methods are provided that introduce or alter electrical characteristics of a power delivery system such as a residential power circuit to alter load profiles to prevent accurate identification of powered devices or disaggregation of distinct device information. This masking may include any of a range of steps or actions or devices to introduce or altering impedance elements or filtration circuits in coordinated fashion with the operation of the targeted devices to be masked. The system may be configured to be applied to hinder or interfere with conventional Non-intrusive Load Monitoring.

10 Claims, 4 Drawing Sheets

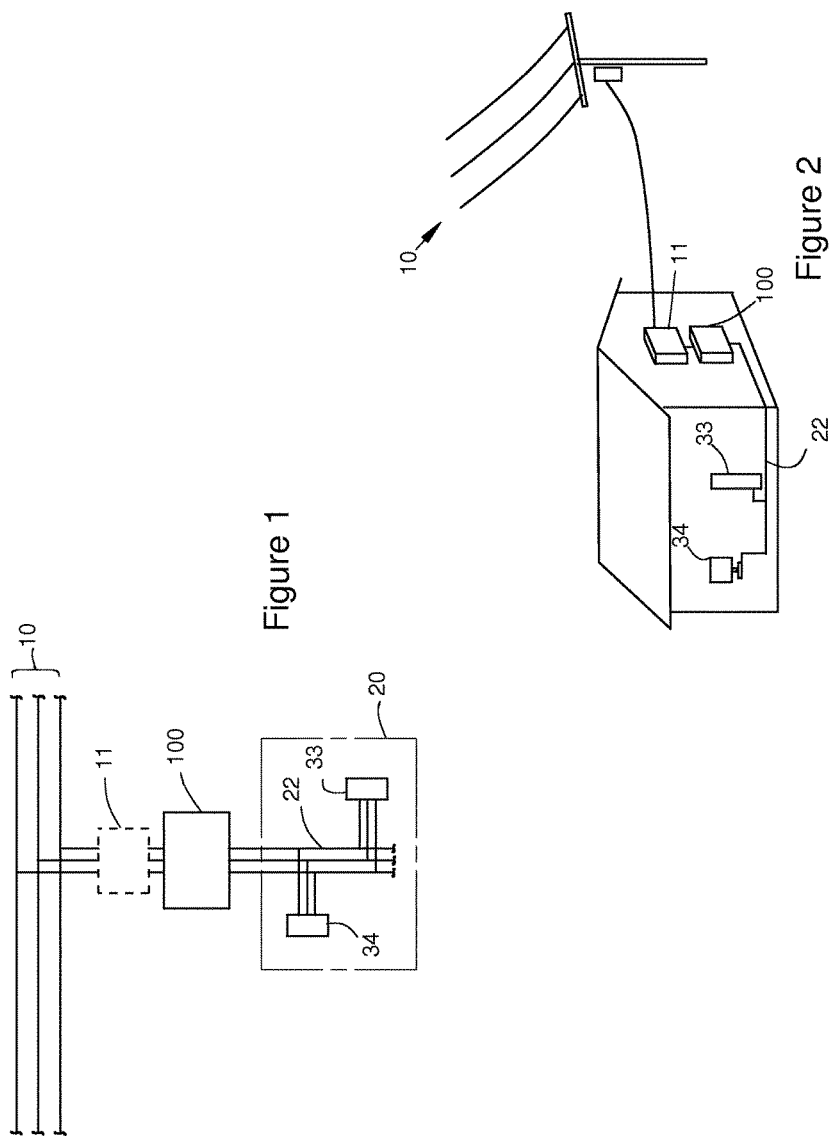

DEVICE MONITORING PREVENTION IN POWER SYSTEMS

BACKGROUND

The present invention pertains to systems and devices and methods for interfering with or preventing remote or external monitoring of discrete electric power supply systems such as a residential electrical power delivery system.

Remote or external monitoring of electric power delivery systems is commonly referred to as Nonintrusive Load Monitoring (NILM). This includes processes for analyzing changes in parameters such as the voltage and current going into a power delivery system such as a house electrical system and deducing what appliances are used in the house as well as their individual energy consumption. Electric meters with NILM technology are used by utility companies to survey the specific uses of electric power in individual homes and other discrete users and spaces. This monitoring is accomplished without entering the space served by the monitored electric power system and without knowledge of the powered devices connected to the system. For this reason, static, repetitive, and unique electrical characteristics are what NILM technology requires to identify and track a discrete component or appliance.

A load profile or power system signal is the overall representation of the electrical data for a specific location in a power delivery system. Gathering such a profile or signal might be the objective of a monitoring NILM "Smart" device. The Smart monitoring device may be a utility meter or a recording device attached to the delivery system internally or externally, known or unknown to the location being monitored.

A load profile or power system signal is a product of the impedance characteristics and operating history of all the electrical elements making up and connected to a power system. Discerning information from a load profile typically requires disaggregation. Disaggregation, the process of separating the load profile information into discernable and discrete electrical loads and appliances can reveal appliance signatures, as one device clearly identified from its On/initial energized state through its normal operation and until its shutdown/off state. The appliance signature depends upon the NILM devices parameters chosen to gain the profiles and signatures, and is an assemblage of one to several electrically measurable changing parameters over time that can be perceived external to the device/appliance on the electrical delivery system. When the parameters are analyzed, they can potentially reveal the device or appliances' identity, its type and potentially specific model, as well as its usage time, status (such as faulty or healthy) and power consumption.

Various different electric load parameters may be discerned from a load profile through disaggregation, including for example: current; voltage; real, reactive, and apparent Power; (KW, KVAR, VA); admittance; harmonics; electrical noise at start, stop, and during runtime; DC Bias current; peak voltage and/or current levels during start-up; duration of start-up transients; shape of start-up and shut-down transients; and power factor.

For a variety of reasons including maintaining privacy and security within a personal or commercial space receiving electrical power from an independent party source, it is desirable to be able to limit or prevent NILM technology from being applied to the associated power delivery system.

What is desired is a device, method or system that may be introduced to a conventional electrical power delivery system to mask, hide, or otherwise make indiscernible the discrete elements of a powered system and thereby disable or prevent detection and monitoring from externally connected systems.

SUMMARY OF THE INVENTION

The invention includes devices, systems and methods that introduce impedance elements to electric power systems in coordination with the operation of powered devices connected to the power system to alter the power system overall load characteristics or signal and thereby inhibit or prevent detection of the powered devices through analysis of load characteristics of the power system. Operation of powered devices is detected or predetermined to enable introduction of system impedance altering elements or circuits in coordination with the occurrence of characteristic events associated with the power powered devices. In this way the characteristics are masked from detection by incidental monitoring of the power delivery system. Masking may include any of a variety of steps or actions or devices to introduce or alter impedance elements or filtration circuits in coordinated fashion with the operation of the targeted devices to be masked.

The invention includes devices and methods to impede or prevent load monitoring of residential housing electrical power systems and associated power usage. It is not necessary nor critical in all applications to mask all electrically functioning elements or events of the involved electrical system continuously, only to apply masking elements in such a way as to disrupt the requirements of the particular capabilities of the monitoring technology desired to be impeded. Effective masking is determined by disabling or inhibiting of load analysis and disaggregation to the degree required for the particular intended result. The extent and nature of masking efforts may be tailored as needed to satisfy the size, scope and budget of the potential customer. Methods according to the invention may include a step of determining or identifying characteristics of the power consuming devices to be masked.

In preferred embodiments of the invention, a masking system includes an integrated system with components for sensing load changes in a power delivery system; a signal processing component that applied predetermined masking data and logic; and multiple impedance altering circuit elements controllable by the signal processing component and connectable to the power delivery system.

In one embodiment of the invention, all the functional elements are integrated into a unitary device that includes a standard 2-phase or 3-phase electrical receptacle plug to be connected to a conventional electrical power system in a residence. The device receives operational power from the power system and through the same connection sensing initiation events of other devices connected to the power system and introduces masking circuit elements.

In various embodiments, impedance changing actions are taken in a substantially random scheme to introduce impedance values that are effective in masking patterns of operational use of a subject device or devices. Other novel aspects of the inventive method will be made clear by the associated illustrations and the below detailed description of embodiments of the invention and claims.

DESCRIPTION OF THE DRAWINGS

FIG. 1 depicts a system according to the invention, connected between a power delivery system and conventional electrical power supply system.

FIG. 2 depicts an example application of a system with the components depicted in FIG. 1.

DETAILS OF EMBODIMENTS OF THE INVENTION

Figure 3:
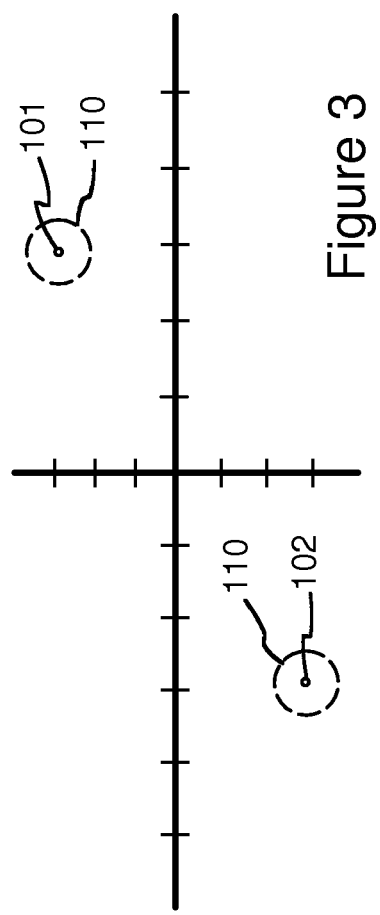
FIG. 3 is a graph of power consumption of a consumer appliance provided to illustrate masking requirements of the invention

The following describes inventive devices and methods for preventing or inhibiting detection and monitoring of discrete electrically powered devices that are connected to an electric power delivery system. An electric power delivery system is a network of conductors, connectors, switches and controls that are established in a fixed space such as a residential living unit or commercial business space such as an office and is designed to allow power consuming devices to be connected for use. Power consuming devices may be exemplified by, but not limited to, in a residence; a refrigerator, a personal blow drier, a computer, a television, and any of a variety of devices that are electrically powered; and in a commercial space, a computer, printer, and other business a variety of electrical and electronic devices.

Herein the terms "detect", "identify", and "monitor" and their various forms with respect to powered devices in a power delivery system mean the identification of the presence and operation of a device directly or through identifying electrical signal or signatures. These terms include events and actions that identify only a presence of some unique discrete device without necessarily identifying or determining the physical nature, characteristics or condition of the device.

As used herein, the term "signal" means an electric potential and current and their temporal relationship, or other detectable characteristic of electric current in a conductor, that is a reflection of the electrical load that is supplied power by a connected power system and the impedance of the device or system of interest. While the electrical load characteristics and impedance of a powered device of interest are not actively created or propagated for the purpose of signaling, characteristics of a powered device load and impedance and changes in those characteristics are considered signals herein as conveying, or potentially conveying, information regarding the device. Herein, the concept of introducing, altering, and producing a signal is used for convenience to indicate the action and result of introducing or removing or altering one or more electric circuit components in the associated system such that the perceptible circuit characteristics, such as impedance, are altered.

Herein, the term "mask" and its forms mean efforts and steps and devices that introduce, alter or produce a signal, or alter system electric signals, in a power system including powered devices such to produce a substantially different power system signal. Effective masking produces a power system signal that is not susceptible to disaggregation to determine the components of the signal produced by, and can identify, subject powered devices.

In prior conventional electrical system device monitoring operations the state and timing of operation of individual power consuming devices in a power system may be identified by electrical power signal characteristics perceivable (if unaltered) at the connection to the power delivery system, by a conventional smart meter or other similarly functioning devices connected to the power supply system or power delivery system. A powered device might have been identified by detected electrical characteristics of known devices such as impedance or operational load timing. For example, an air conditioning compressor may have a known voltage and current transients that correspond with start and stop cycles of an air conditioning cooling system. In other examples, the existing of an unknown unique discrete device may be detected based on repeated occurrences of the same signals over time. Signal characteristics that may be used to identify unique devices include, but are not limited to: voltage and voltage changes and current; real, reactive, and apparent power (KW, KVAR, VA); signal harmonics; electrical noise at start, stop, and during runtime; DC Bias current; peak voltage and/or current levels during start-up; duration of start-up transients; shape of start-up and shut-down transients; power factor; daily timing of power use. The present invention considered alteration or manipulation of each of these characteristics as potential effective masking efforts.

In any particular power delivery system of interest, the particular connected power consuming devices, existing or anticipated to be used, define in part the characteristics or parameters that must be addressed by masking to accomplish the desired disabling of system monitoring. As well as the devices themselves and their electrical operational characteristics, the nature of their use in the power delivery system define relevant device characteristics. Among others, the device connection and disconnection timing relative to a human user's operation and their connection and disconnection timing relative to the use of other devices may also define relevant characteristics.

FIG. 1 is one configuration of an inventive "Smart Block" system, according to the invention, connected between a power delivery system and conventional electrical power supply system. FIG. 2 depicts an example application of a system with the components depicted in FIG. 1. The invention is intended to operate in conjunction with or associated with both a conventional electric power supply system 10 and a electric power delivery system 20. The power supply system 10 is most typically composed of elements of a municipal power supply system such as is provided by many electric utility companies. This is most typically an alternating current (AC) system of two phases that is conducted through a network of above-ground or buried conductors connecting power utility company power generators to customer power delivery systems.

Electric power customer or consumers connect power consuming devices to the provided power supply system network typically through a customer power delivery system such as represented here. The power delivery system 20 may be a simple or complex network of conductors and connectors arranged to accommodate known or anticipated power consuming devices. In FIG. 1 the power delivery system 20 is depicted schematically with conventional conductors 22 connecting different powered devices 33, 34. While three parallel conductors (representing conventional three-phase current) are shown, this is not limiting and many such existing systems are only two-phase.

In FIG. 2, the power delivery system is illustrated as a simplified typical internal electrical wiring system of a conventional residential building (various elements such as receptacles and junction boxes are left out for clarity). As illustrated, the power delivery system 20 is designed to provide electrical power connection to powered devices 33, 34. It should be clear that a particular power delivery system may have any of infinite different configurations and characteristics and may include any of a great variety of, and combinations of, different power consuming devices.

To accomplish the desired masking, a Smart Block 100 device or system, according to the invention, is connected to, or integrated into, the power supply system 10, preferably between the power supply system and the power delivery system 20. The Smart Block represents the functional elements of one embodiment of the invention. A conventional monitoring device 11, such as what is commonly referred to as a "smart meter" may be incidentally connected to the power supply system 10 but the existence or operation of the smart meter or other monitoring device is not necessary for the function of the invention. The Smart Block is illustrated as a single element but may be formed of multiple physically separated elements that are functionally connected.

The function of the Smart Block is to introduce masking signals simultaneous with the powered device signals or at other times during monitoring periods to substantially or effectively mask the identity of a powered devices. The nature of an effective masking effort or signal is dependent in part on the characteristics of the powered device signal that enable identifying the device, as well as the capabilities of the incidental monitoring system.

Where the objective of the masking efforts is to mask the identity of a particular powered device among a family of similar devices, the requirements of the masking efforts may be satisfied by altering the signal of the particular device sufficiently that the perceived (monitored) signal is more representative of other devices among the family of similar devices.

For example, a family of different residential refrigerator models may each draw 2 amperes of current at 110 volts AC, but each have a different maximum current during a startup transient. Effective masking to prevent identifying the particular refrigerator among the models may be accomplished by altering the perceived system startup current maximum an amount equal to the difference between the various different maximum currents. If, at each subsequent startup of the refrigerator, a different alteration of the current (addition or reduction) is introduced, it is possible to prevent establishing the identity of any particular refrigerator. In this way, if the power delivery system is monitored, it would be impossible to differentiate the particular refrigerator from the family of models based on comparison with the characteristic of the maximum current. It should be clear that the powered device (e.g. refrigerator) itself and its electric usage it not altered, all alternations are external to the device and within the associated power delivery system.

FIG. 3 is a graph of power consumption of a consumer appliance such as a refrigerator that uses both real power and reactive power during its power-on and power-off cycles. The figure's horizontal axis represents real power and the vertical axis represents reactive power. The points 101, 102 represent the characteristics of the appliance under conventional condition. With prior knowledge of these data points, a smart meter could discern the presence of the appliance by detecting these power values in the associated power delivery system. The dashed circles around each point 101, 102 represents the maximum deviation 110 of detected power signals from the known power value that enable the monitoring system to relate the signal to the actual appliance. This amount of this deviation (distance from the actual values) may be dependent on a range of factors, including the nature of the device being monitored, changes with the advances in monitoring technology, and changes in the characteristics of the device being monitored.

Figure 4:
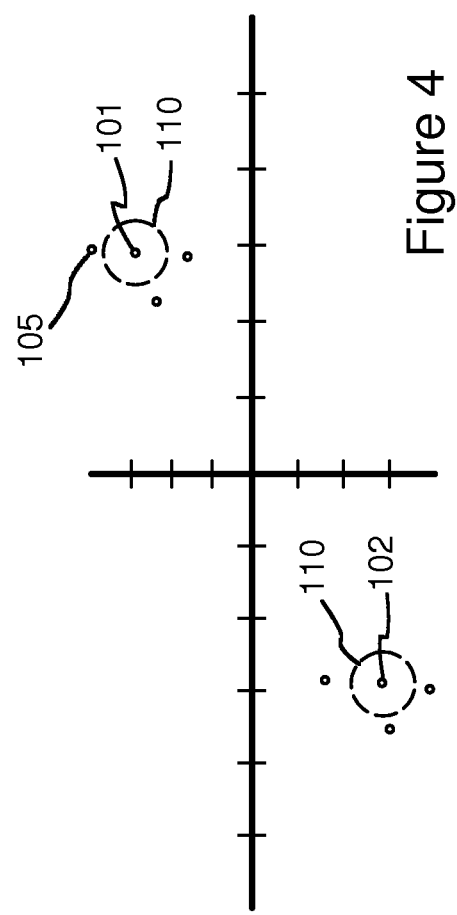
FIG. 4 is a graph of power consumption of a consumer appliance with masking applied according to the invention.

FIG. 4 is a graph of the power signal generated in the power delivery system associated with the same device as discussed regarding FIG. 3, combined with masking signals applied to the power delivery system according to the invention.

The masking signals have been configured to result in a combined power 105 which is outside the deviation 110. In this way, the monitoring system is hindered or disabled from determining the true value of the power, and thus the true identity of the appliance.

There may be one or more defining characteristics of a single powered device, or a family of similar devices. The amount and nature of the required alteration of the electrical signal may be a factor of a combination of characteristics of one or more different powered devices. In any case, successful masking requires alteration to the degree preventing resolution of the distinctions between those devices.

Successful masking requires prior knowledge of the potentially defining signal characteristics of the powered devices to be masked. It some cases, it is possible to apply effective masking signals to a system without regard to the temporal nature of the powered device signal in the system. For example, temporally random masking signals may be effective if properly designed with respect to the subject powered device signal.

In many cases it is preferred to coordinate, in time, the masking signals with the powered device signal to most effectively mask the defining characteristics of the device signal. Because, incidentally, most powered devices of interest have random or very intermittent use cycles, it is useful and preferred to include in the inventive masking system and methods a signal detection capability, step, component.

Figure 5:
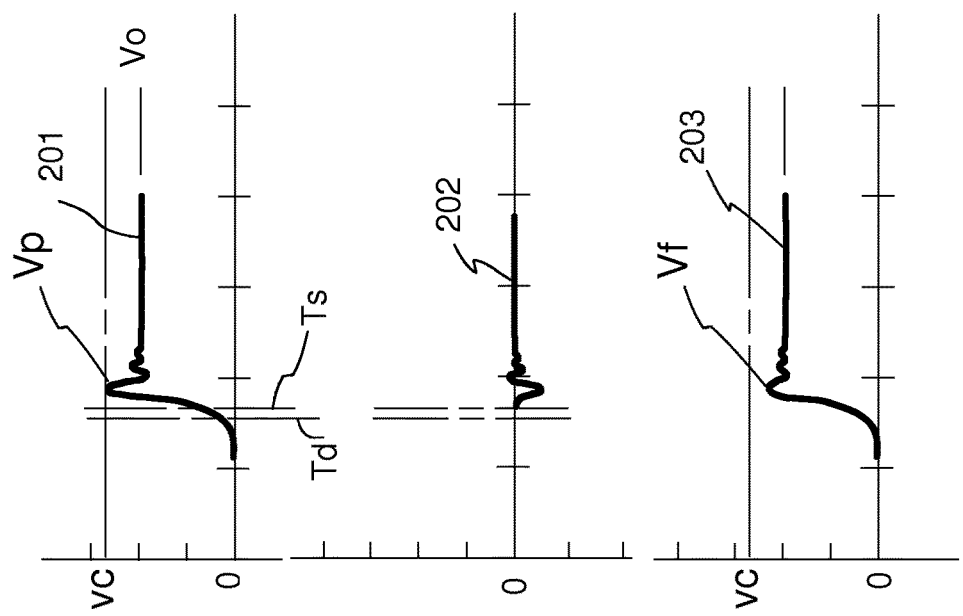
FIG. 5 are simultaneous plots of voltage over time for a powered device, a masking signal, and for the powered device with masking.

FIG. 5 illustrates the temporal application of a masking signal relative to a target powered device signal to be masked. FIG. 5 provides three time plots of signal voltage of: a powered device 201, a masking signal 202, and the resulting combined signal 203. The powered device signal 201 is the line voltage as could be detected and identified in the conductive circuit elements of a power delivery system to which the powered device is connected. The masking signal 202 is the line voltage as would be detectable in the same power delivery system if applied alone, separated in time from the powered device or other signal generating devices. The combined signal 203 is the voltage signal similarly detected when the masking signal 202 is applied as suggested to mask, and prevent detection of, the powered device signal 201.

The powered device signal 201 is only generally representative of some characteristics of some powered devices and is not intended to be defining of any or all devices signals, nor limiting of the invention. Initially, the powered device signal 201 quickly rises to a peak value Vp equal to the signal maximum positive value Vc. Subsequently, the powered device signal 201 drops to a stable operating value Vo. The device may be identifiable if the signal maximum Vc is characteristic of the device, or alternatively, for example, the difference the signal maximum Vc and the operating value Vo may be characteristic. In such a case, the masking system monitors the power delivery system and detects the powered device signal 201 at a time Td. The masking system then applies appropriate circuit elements to the power delivery system to generate the masking signal 202 beginning at time Ts. The masking signal 202 is designed, with an initial negative value coincident with the peak Vp, to eliminate the defining characteristics when the signal on concurrent. After the initial masking period, the masking signal 202 is reduced to zero.

The combined signal 203 is what would be detected in the power delivery system when both the powered device signal 201 and masking signal 202 occur in the coordinated fashion as suggested. The new peak value Vf of the combined signal 203 is substantially below Vc and the characteristic value of the subject device. An incidental monitoring system attempting to identify the subject device through detection of a signal having Vc would be disabled.

The above mode of masking results in a combined signal that is repeated if the same masking signal is used. In some applications, it may be necessary to vary the masking signal over time in subsequent use events. Preferably, one or more of the characteristics of the masking signal is random. This may take the form of temporal variations, or signal amplitude variations or other variations of the characteristics of the masking signal. Addition of distinction masking signals, and use of multiple distinct masking signals is considered here to be a variation of the signal. While perfect randomness is often not possible, it is sufficient here that the variations or changes are substantially without pattern or discernable logic within the relevant time period.

In the above example, the masking activity was initiated by the detection of the start of device operation signaled by the increase, from zero, of voltage. A masking effort may be initiated by detection of any change in device signal. For example a device may have a distinct shutdown cycle that must be masked to preclude its detection. It such a case, a change in voltage or current from an operating state may be the initiation event to be detected.

Figure 6:
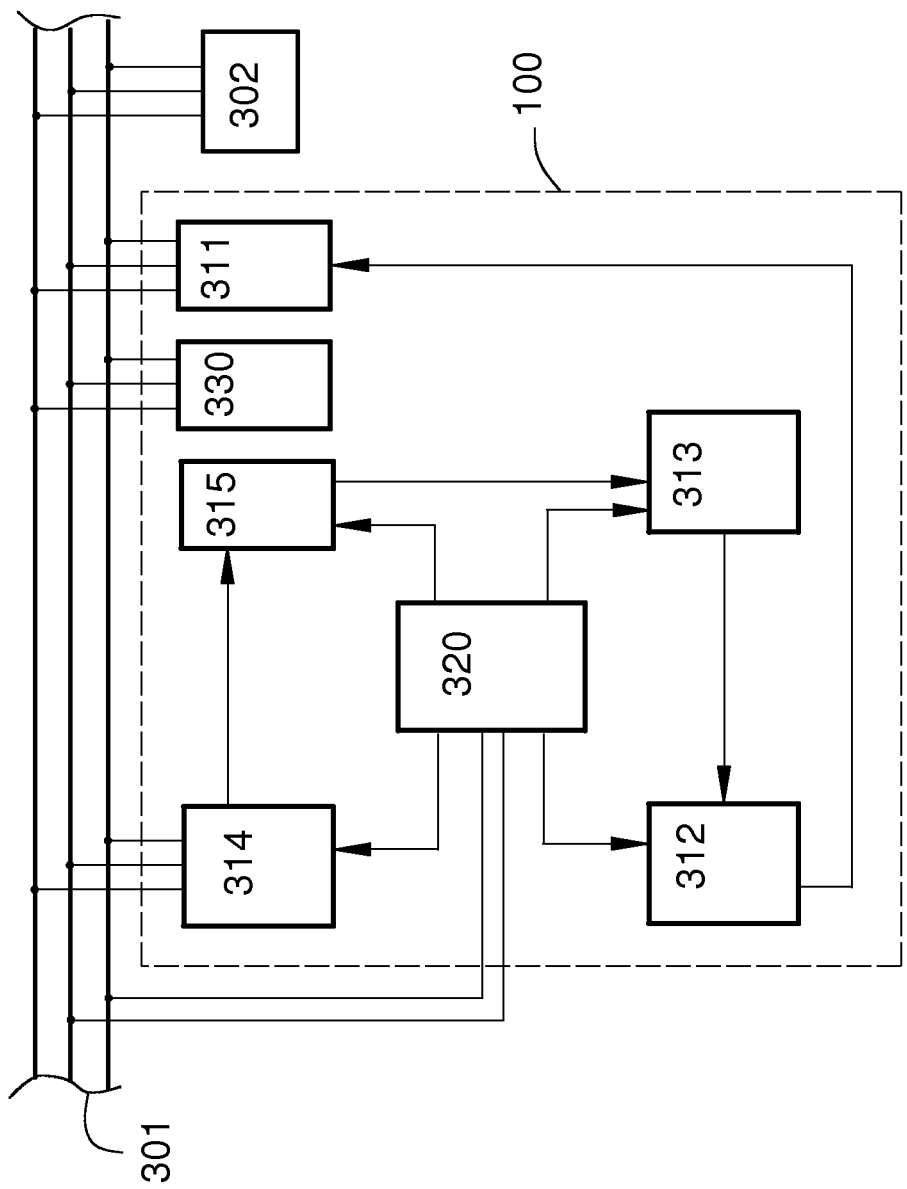
FIG. 6 is one embodiment of a masking system connected to a power supply system.

FIG. 6 is a schematic depiction of the elements of one exemplary configuration of a masking system according to the invention and its connectivity with a power delivery and a typical powered device.

Three conductors of a power delivery system 301 electrically connect both the masking system 100 and a subject powered device 302 to a power supply system (not shown). It should be clear that there may be no clear boundary between the elements of the power supply system and the power delivery system 301 and the elements connecting directly to the powered device. In many practical applications, there may be a power consumption meter owned and operated by a power supply system owner company, and this may provide an arbitrary boundary without relevance to the function of the masking system.

The functional elements of the masking system include impedance altering components 311 that provide the signal producing effects to effect masking. The impedance altering components preferably includes elements having electrically resistive, capacitive, inductive properties and may be discrete active or passive electronic, electrical, electromechanical components and complex circuits or solid state devices. While illustrated as a single element, the impedance altering components 311 may be made up of multiple components or circuits grouped together physically, or may be separated.

Because a powered device may have characteristics such as harmonics which may be transient or continuous relative to the operation of the device, the masking system 100 may include devices such as filters that may applied in coordinated fashion as discussed below, or may be applied continuously. In any case, application of filters and similar devices or circuits to remove powered device characteristics from a system is considered masking effort.

The impedance altering components 311 are directly controlled by a switching module 312. The switching module 312 is itself controlled in part by a signal processing unit 313 that includes timing and logic and memory functions and communication abilities.

A sensing circuit 314 is connected to the conductors of the power delivery system 301 and is configured to sense or detect the initiation events in the power delivery system. The sensing circuit connections may include direct electrically conductive continuity such as is typically used for voltage measure, and also include inductive connection such as is often used for current measurement. Both are considered a functional connection herein. An initiation event may be any predetermined signal originating from a targeted device of interest. An initiation event functions to provide a temporal baseline for masking efforts. The output of the sensing circuit 314 is conveniently processed by an Analog-to-Digital converter 315 before passing to the signal processing unit 313. Each of the switching module 312, signal processing unit 313, the sensing circuit 314 and the AD converter 315 are connected to a power supply 320. Filters 320 are also provided to enable static filtering of signal components as part of a masking scheme.

In operation, the sensing circuit 314 detects an initiation event in the associated power delivery system in which are connected one or more power consuming devices, one or more of which may be targeted devices of interest for masking. The sensing circuit 314 convey information to the signal processing unit 313, through the converter 315. The signal processing unit 313 includes predefined algorithms or programs or other determining elements that specify a masking effort or event as well as information defining characteristics of powered devices to be masked. The signal processing unit 313 controls the switching module 312 which in turn controls the impedance altering components 311 to apply the desired components to the power delivery system 301.

In alternative configurations or methods of operations, the introduction of impedance altering components may also be based on predetermined or detected characteristics of powered devices in the powered device 302, rather than real-time operational events. Such characteristics may include such as device typical operational durations and typical daily hours of operation. Depending on the desired masking objective, impedance altering components maybe introduced on a random or non-random time basis, in coordination with the timing of device operations. In this way, the impedance profile over time of the power system may be altered to introduce additional features masking device operation. Such features include "false-positive" signal features that mimic device characteristics.

The particular arrangement of components of the masking system 100 is not critical and components may be combined in various different ways or integrated into a single module. Similarly the masking system 100 may be configured to provide a pass-through element allowing powered devices 302 to the connected to the power supply system through the masking system 100.

It should be clear that the requirements for successful monitoring, and therefore successful masking, may depend on the prior knowledge and ability within the monitoring system respecting the discerning characteristics of the target devices of interest. That is, masking efforts need not be more sophisticated than the monitoring systems. As monitoring systems become more sophisticated over time and able to discern more of the available characteristics of devices desired to be monitored, it may be necessary for masking systems to also change to provide effective altering of signal.

The invention claimed is:

1. A method of masking electrically powered devices connected to an electric power system, the method comprising:
   maintaining electrical connection with a power system connected to at least one powered devices;
   detecting an initiation event associated with operation of said at least one powered devices;
   introducing circuit elements to the power system to alter the impedance characteristics of the power system to mask said at least one initiation event of said at least one powered devices.

2. The method according to claim 1 further comprising, detecting one or more subsequent initiation event of said at least one powered devices and altering said impedance characteristics of the power system to mask said subsequent initiation event.

3. The method according to claim 1 further comprising, determining at least one electrical characteristic of each of the powered devices.

4. The method according to claim 3 wherein said electrical characteristic has a determined amplitude.

5. The method according to claim 1 further comprising, altering said impedance elements repeatedly to the power system during repeated operational cycles of said at least one powered devices, wherein each introduced impedance altering circuit element has at least one unique relative timing aspect or at least one unique impedance value.

6. The method of claim 1 wherein said impedance characteristics are altered to produce, in operational combination with the electrical characteristic amplitude of the powered device, a combined electrical characteristic amplitude which differs from the electrical characteristic amplitude of the powered device of at least ten percent.

7. The method of claim 2 wherein said circuit elements introduced to the power system upon detection of a subsequent initiation event is varied in relation to previous circuit elements introduced for said powered device.

8. The method of claim 1 wherein said circuit elements introduced to the power system upon detection of an initiation event are randomized.

9. A system for inhibiting detection of powered devices connected to an electric power system comprising:
   sensor circuits configured to be connected to a power system and capable of detecting changes in voltage and current in the power system;
   a processor including characteristic event impedance data associated with each of a multiple powered devices, said processor configured to receive detection signals from the sensor; and
   a masking means for introducing circuit elements to the power system to alter the impedance elements of the power system in coordination with the occurrence of powered device characteristic events.

10. A method for inhibiting detection and monitoring of powered devices within a power system, the method comprising:
   determining electrical characteristics of at least one powered device connected to a power system;
   repeatedly introducing impedance altering elements to the power system in coordination with multiple operational periods of the at least one powered device to alter the electrical profile of the power system to mask the electrical characteristics of at least one initiation event of said at least one powered device.

* * * * *